United States Patent [19]

Kant

[11] 4,197,488

[45] Apr. 8, 1980

[54] ELECTRICAL MACHINE

[75] Inventor: Michel Kant, Paris, France

[73] Assignee: Agence Nationale de Valorisation de la Recherche (Anvar), France

[21] Appl. No.: 788,098

[22] Filed: Apr. 15, 1977

[30] Foreign Application Priority Data

Apr. 15, 1976 [FR] France .................. 76 11161

[51] Int. Cl.² .............................................. H02K 7/06
[52] U.S. Cl. ...................................... 318/115; 310/12; 310/14; 310/49 R
[58] Field of Search ...................... 310/49, 12, 14, 112, 310/114, 83, 13, 103, 180; 318/115, 38

[56] References Cited

U.S. PATENT DOCUMENTS

| | | | |
|---|---|---|---|
| 2,860,266 | 11/1958 | Schrader | 310/83 X |
| 3,204,136 | 8/1965 | Kaiwa et al. | 310/49 |
| 3,293,459 | 12/1966 | Kreuter et al. | 310/49 |
| 3,441,819 | 4/1969 | Palmero | 318/115 |
| 3,453,510 | 7/1969 | Kreuter et al. | 310/49 X |
| 3,869,625 | 3/1975 | Sawyer | 310/12 |

FOREIGN PATENT DOCUMENTS 945225 12/1963 United Kingdom ............... 310/80

OTHER PUBLICATIONS

*IBM Tech. Disclosure Bulletin*, vol. 16, No. 2, 7/73, "Linear-Rotary Actuator & Transducer for Stick Printer," Meier.

*Primary Examiner*—Donovan F. Duggan
*Attorney, Agent, or Firm*—Beveridge, De Grandi, Kline & Lunsford

[57] ABSTRACT

An electrical machine having an armature capable of both rotational movement and translational movement and which can be driven by alternating current or by stepwise control pulses. The coil of the machine is divided into two half-coils which are electrically separated and which each act on a separate group of pole teeth. The armature likewise has two groups of pole teeth, each of which cooperates with a group of teeth of the coil. The teeth are symmetrical with respect to the median plane of the machine, and the coil teeth lie at a different angle with respect to that median plane than do the armature teeth. The two half-coils are separately energized to produce moving poles in space.

37 Claims, 11 Drawing Figures

ELECTRICAL MACHINE

The present invention pertains to an electrical machine. More particularly, the present invention pertains to an electrical machine having an armature capable of both rotational movement and translational movement.

From the papers of R. J. A. PAUL and C. G. REID in the journal "Proceedings of the IEEE", there is known a variable-reluctance stepping motor in which the pole teeth of the fixed winding having a helical form and the pole teeth of the movable armature have an annular form, perpendicular to the axis of the armature. The armature of this motor can only be moved in longitudinal translation, helical movement being considered a disadvantage and thus being avoided by means of the annular teeth.

There is likewise known, from U.S. Pat. Nos. 3,376,578 and 3,457,482, a bidirectional linear stepping motor, that is, a motor the armature of which is capable of displacement in either of two orthogonal directions by means of two planar and mutually parallel winding assemblies. However, the displacement of each movable assembly takes place only in a single plane, and this motor necessitates a separate control of the two movable assemblies.

U.S. Pat. No. 3,869,625 discloses a motor assembly capable of translation and of rotation and having its coil divided into two half coils separated by a magnetic ring. The pole teeth of these two half coils have a generally annular form, and the rings thus formed are perpendicular to the longitudinal axis of the motor. The armature of the motor has pole teeth of helical form which lie at a predetermined angle with respect to a plane perpendicular to the longitudinal axis of the motor. However, because of the presence of the magnetic ring and because of the limitation of stepwise control, this motor is a positioning motor and is not capable of either continuous movement or of rapid reversal of the direction of rotation.

The present invention is an electrical machine capable of being driven equally well by alternating current or by stepwise control pulses, and permitting continuous movements of rotation and/or of translation, the directions of each of which are easily and rapidly reversible.

In the electrical machine of the present invention, the coil is subdivided into two electrically separated half-coils, each acting on a separate group of pole teeth, and the armature likewise has two groups of pole teeth. Each group of the armature pole teeth cooperates with a group of teeth of the coil. The teeth of the two groups of the coil are substantially symmetrical with respect to the median plane of the machine, i.e., a plane perpendicular to the longitudinal axis of the machine and lying at the center of the machine. Likewise, the teeth of the armature are substantially symmetrical with respect to this median plane of the machine. The angle between the teeth of the coil and the median plane is different from the angle between the teeth of the armature and the median plane. The two half-coils are separately energized, preferably, with alternating current, to produce moving poles in space.

According to one embodiment of the present invention, the electrical machine has a movable armature which is divided into two half-armatures. Each of these half-armatures is positioned as an extension of the other, and the two half-armatures are mechanically interconnected. The electrical machine further includes a fixed coil body member, divided into two half-coil body members, each of which is likewise positioned as an extension of the other, and these two half-body members are mechanically interconnected. The two half-coil body members support two half-coils. Each of the pole teeth of each of the groups of the coil and of the armature makes an angle of between about 0° and about 85°, preferably between about 0° and about 45°, with respect to the median plane. The teeth of each assembly lie at an angle of, preferably, between about 5° and about 40° to the associated teeth of the other assembly. Preferably, the teeth of one of the two assemblies extend substantially perpendicularly to the axis of the machine, while the teeth of the other assembly extend helically with respect to the axis.

According to another embodiment of the present invention, the two half-coils overlap, as do the two half-armatures.

The machine according to the present invention, can be of the variable-reluctance type or of the induction type. To ensure operation by induction, electric conductors forming a "squirrel-cage" can be disposed between the teeth of the armature. The two coil half-windings of such a machine can be monophase of polyphase, and can be mutually out of phase in space. The mode of winding is chosen so as to obtain the desired mechanical and/or energy characteristics.

The invention will be better understood with the aid of the detailed description of several embodiments, given by way of non-limitative examples of a motor, and illustrated by the attached drawings in which.

Figure 5:
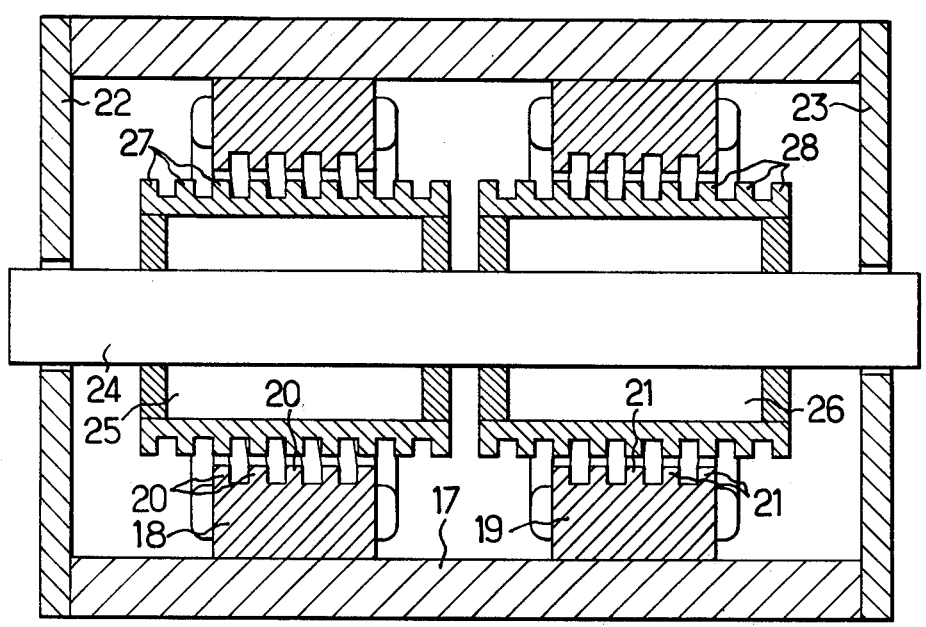
Figure 7:
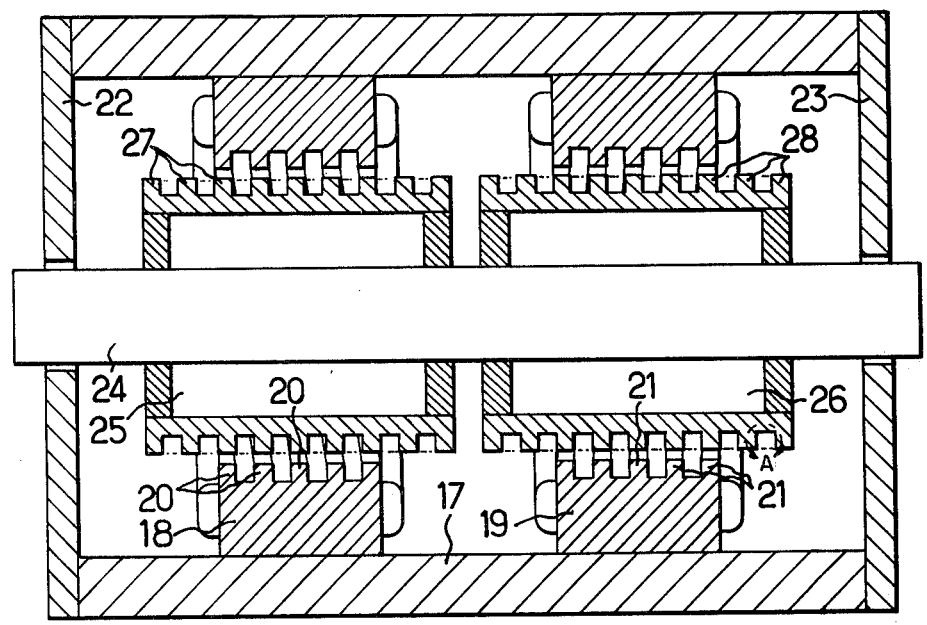
Figure 8:
Figure 6:
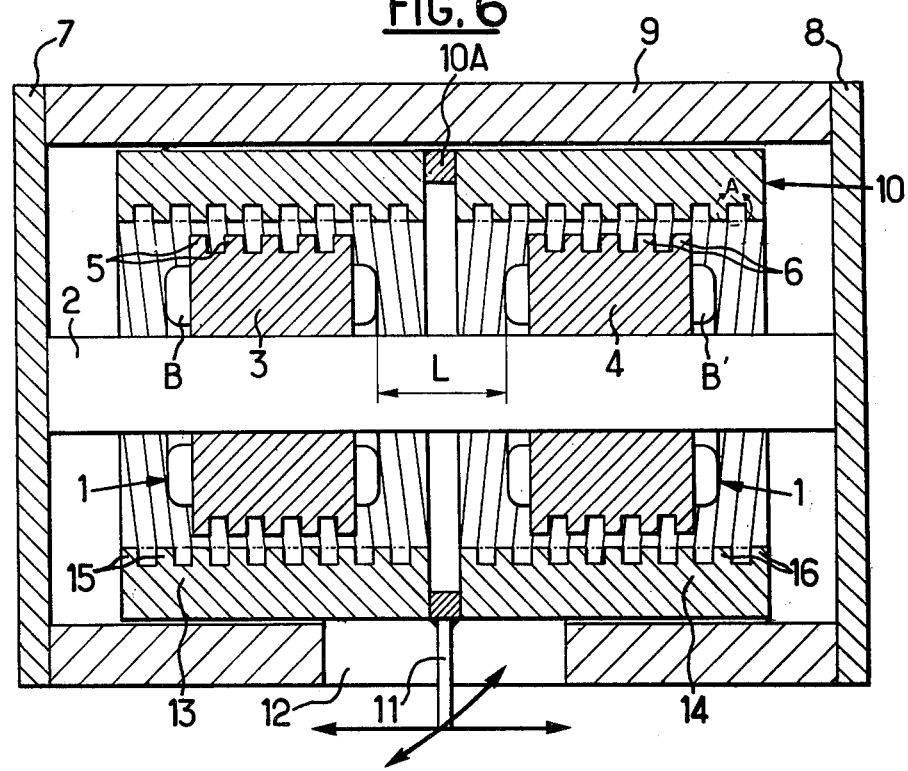
Figure 9:
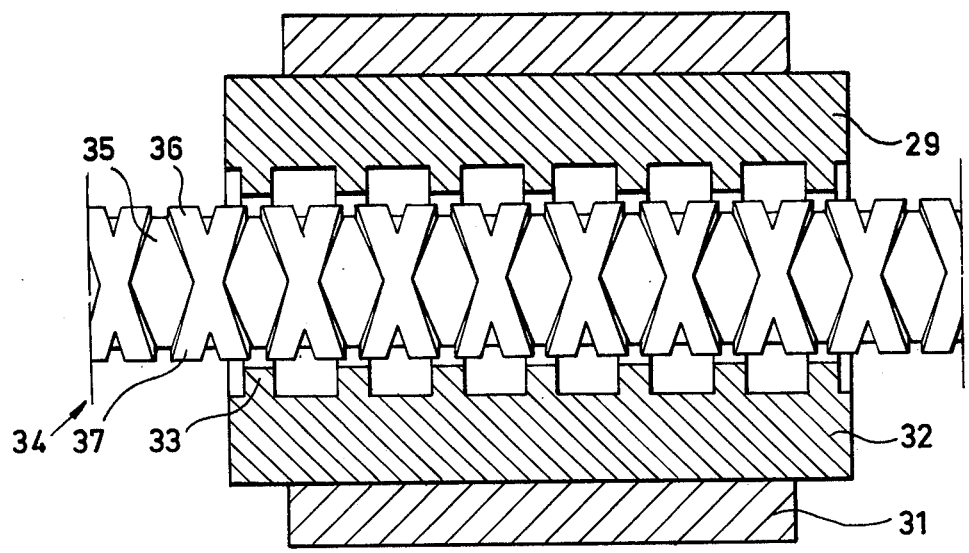
Figure 11:
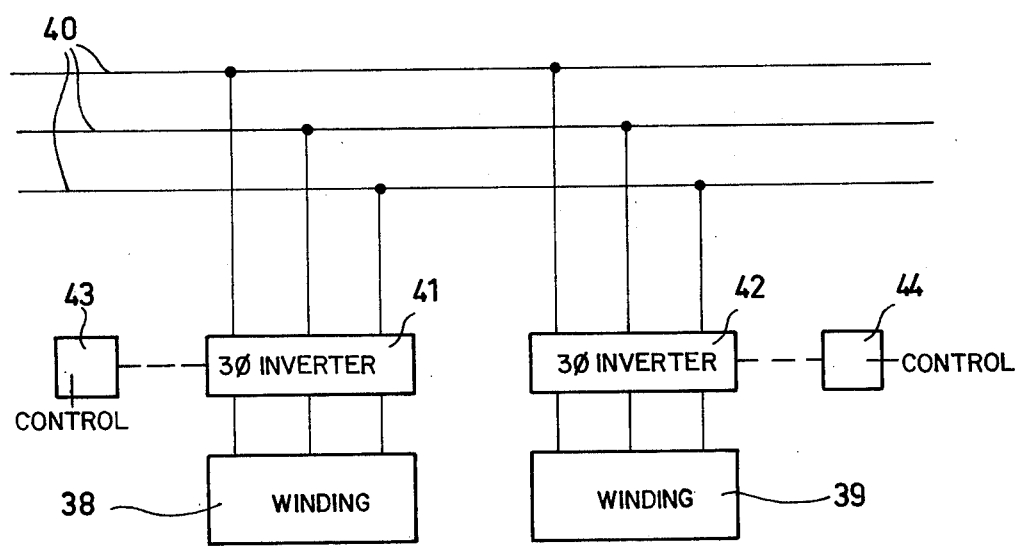
Figure 10:
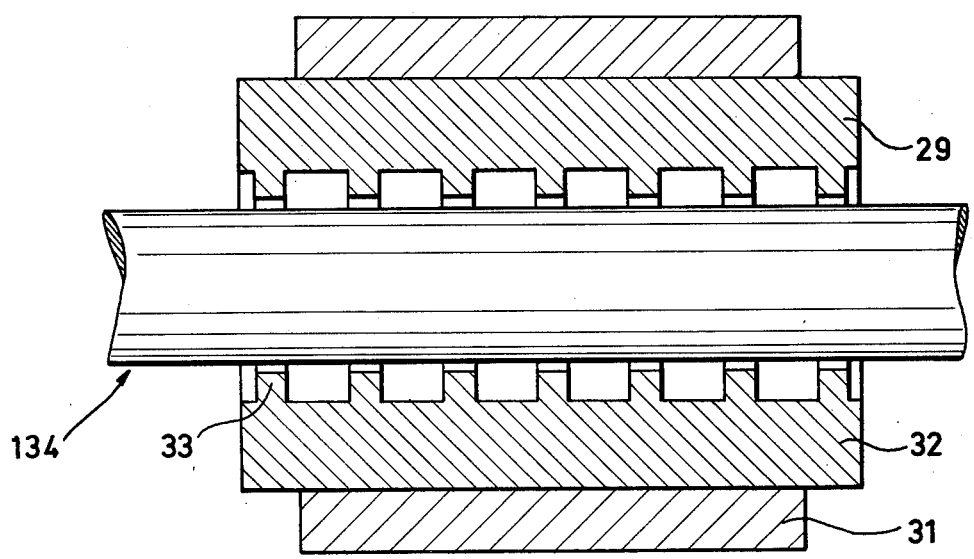

Each of FIGS. 5, 6, and 7 is a schematic sectional view of another embodiment of a motor in accordance with the present invention;

FIG. 8 is an enlarged fragmentary view of portion A—A of each of FIG. 6 and FIG. 7;

Each of FIGS. 9 and 10 is a schematic sectional view of a further embodiment of a motor in accordance with the present invention; and FIG. 11 is an electrical connection diagram suitable for a motor in accordance with the present invention.

Figure 1:
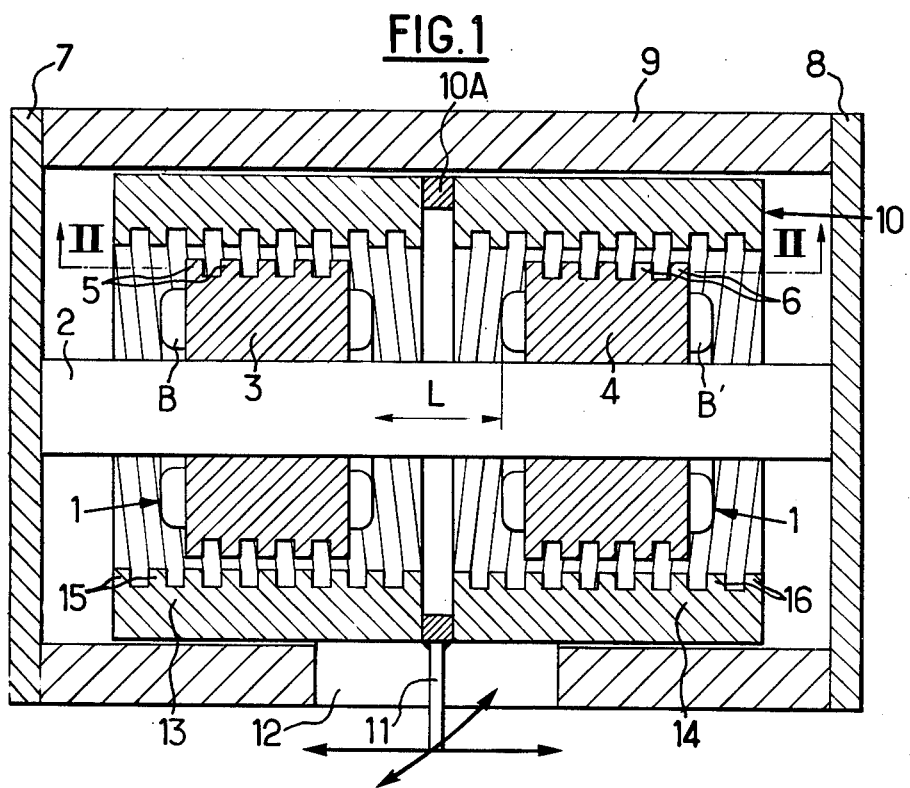
FIG. 1 is a schematic sectional view of one embodiment of a motor in accordance with the invention.

The motor shown in FIG. 1 is a variable-reluctance motor, but it could equally well be a variable-reluctance and induction motor. This motor has a generally cylindrical form and includes an internal fixed coil member 1 mounted on a shaft 2. Coil member 1 includes two half-coil body members 3 and 4. Each of the half-coil body members 3 and 4 has an excitation winding B, B', respectively. The distance L separating the facing surfaces of the coils B and B' can be substantially zero, because if the coils are correctly made, there is practically no mutual parasitic reactance between the two half-coil body members 3 and 4. There is theoretically no upper limit to the distance L, but in fact this distance is limited by space requirements or economic considerations, and it is, preferably, less than one meter.

Each of two half-coil body members 3 and 4 has a series of pole teeth 5 and 6, respectively, of tooth pitch d, and the windings B and B' produce 2 p poles. FIG. 1 illustrates teeth 5 and 6 with a rectangular cross section, but this cross section can be different. The teeth 5 and 6 have a generally annular form, the median plane of the annuli thus formed being substantially perpendicular to the axis of shaft 2. The teeth 5 are, preferably, equidistant apart, as are the teeth 6, and the interval between the teeth is preferably substantially equal to the width of the teeth, i.e., this interval is substantially equal to one-half the tooth pitch d. The teeth 5 and 6 preferably have an identical cross section, and their minimum number is equal to one tooth per wavelength.

A cylindrical body 9 is mounted on shaft 2, by means of two end supports 7 and 8, so that body 9 is coaxial with coil 1. An armature 10 is positioned within body 9, so as to be movable both in rotation and in translation by means of bearing devices (not shown). Armature 10 surrounds the two half-coil body members 3 and 4 and is integral with an arm 11 which extends through an appropriate opening 12 in body 9 in order to transmit the movements of the movable armature 10.

Armature 10 is formed of two half-armature body members 13 and 14 of ferromagnetic material interconnected by a ring 10A of non-ferromagnetic material. Each of the half-armature body members 13, 14 has a number of pole teeth 15 and 16, respectively, equal to the number of pole teeth of the corresponding half-coil body members, there being at least one tooth per wavelength. Each of the pole teeth 15 and 16 has a cross section which is preferably the same as that of the teeth 5 and 6. The teeth 15 and 16 are preferably equidistant apart, with a tooth pitch d' which is preferably equal to the pitch d of the teeth 5 and 6. However, if desired, in some cases different intervals can be provided between adjacent teeth, particularly at the extremities. The air gap formed between the teeth 5, 6 and the teeth 15, 16 should, as in the case of conventional motors, have a minimum value compatible with manufacturing tolerances and with functional play.

In contrast to the teeth 5 and 6, the teeth 15 and 16 are cut helically on the internal face of the half-armature body members 13 and 14, respectively, with a helical pitch ph which is equal to the product of the tooth pitch d' multiplied by the number 2p of poles of coil member 1, thus, ph=d'×2p. Given that, according to the present invention, the groups of teeth 15 and 16 should be symmetrical with respect to the median plane of the two corresponding half-armature body members 13, 14, and the pitch of the helix formed by the teeth 15 should be opposite the pitch of the helix formed by the teeth 16.

The number of teeth of each of the two movable half-armature body members is advantageously equal to the number of poles of the corresponding half-coil body member. There will be clearly seen, in FIG. 2, the mutual positioning of the teeth 5 and 6, and the teeth 15 and 16. The teeth 5 and 6 are substantially mutually parallel and are substantially perpendicular to the axis of the motor, while the teeth 15 and 16 make substantially equal and opposite angles α and α', respectively, with respect to the median plane of the two half-coil body members 3 and 4, the path XX' of this plane being marked on FIG. 2.

In a modified embodiment of the present invention, the teeth 15 and 16 can be annular and substantially perpendicular to the axis of the motor, while the teeth 5 and 6 are helical in the half-coil body members 3 and 4, with opposite pitches. In addition, a motor in accordance with the present invention can be provided as a variable-reluctance and induction motor by providing a conductor in each of the helical slots formed between the teeth 15 and 16, thus forming a "helical cage".

Operation of the motor of FIG. 1 is described with reference to FIGS. 3 and 4, each of which depicts a single set of the different teeth 5, 6, 15 and 16, in enlarged views similar to those of FIG. 2. When windings B, B' of the two half-coil body members 3 and 4 are fed according to a fixed sequence at zero frequency, fixed poles are produced in space. On the corresponding teeth 5 and 6 there are produced in each case 2 p poles. Let O-x be the axis common to two of the poles $P_1$ and $P_2$ of the teeth 5 and 6 respectively. The equilibrium position, shown in FIG. 3, of movable armature 10 is such that the centers $C_1$ and $C_2$ of the respective surfaces $S_1$ and $S_2$ of orthogonal projections of the movable teeth 5, 6 are situated on the axis O-x. There is then a minimal reluctance between the fixed winding and movable armature, as is known in the art.

Figure 4:
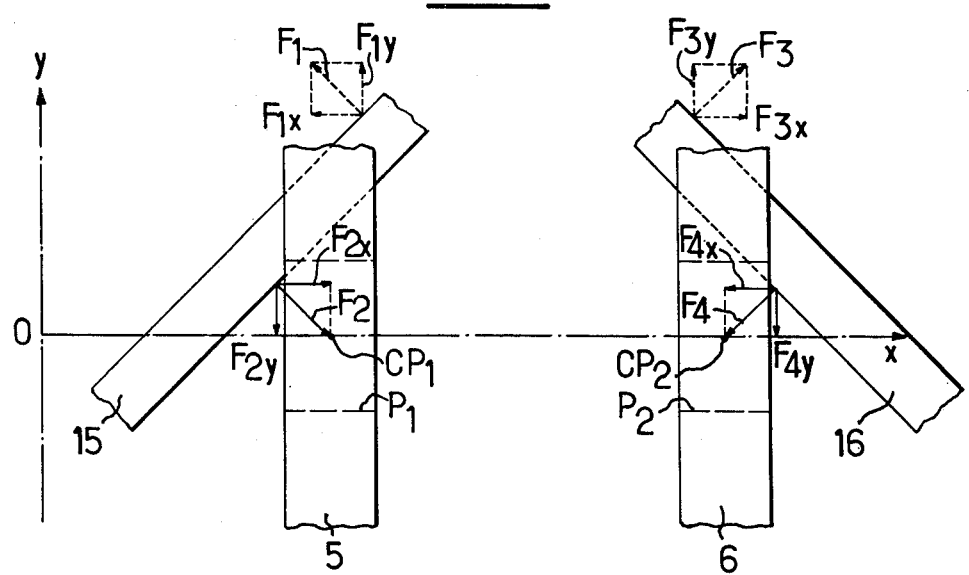

If armature 10 is slightly displaced from this equilibrium position by causing it to rotate so that the teeth 15 and 16 are displaced upward, as shown in FIG. 4, restoring forces $F_2$ and $F_4$, respectively, are exerted on the teeth 15 and 16 of this armature, tending to return the armature to its equilibrium position. These forces $F_2$ and $F_4$ are directed towards the centers $CP_1$ and $CP_2$ of the poles $P_1$ and $P_2$, respectively, and are perpendicular to the orientation of the teeth 15 and 16, respectively, since the restoring forces are exerted along the shortest distance to the centers $CP_1$ and $CP_2$ from the corresponding lateral faces of the teeth 15 and 16. To aid in understanding the action of these restoring forces, in FIG. 4 the restoring forces $F_2$ and $F_4$ have been resolved into their components, $F_{2x}$ and $F_{4x}$, respectively, parallel to axis O-x, and their components, $F_{2y}$ and $F_{4y}$, respectively, perpendicular to axis O-x. The components $F_{2x}$ and $F_{4x}$ are directed towards each other, and, because of the fact that the teeth 15 and 16 are immobile with respect to each other, these two components have no effect on the movement of armature 10. On the other hand, the two components $F_{2y}$ and $F_{4y}$ are both in the same direction and consequently the force components $F_{2y}$ and $F_{4y}$ add together, causing the armature to rotate in the direction of these two force components.

In the same way, if armature 10 is caused to rotate slightly in the direction opposite that just discussed, force $F_1$ and $F_3$ result, directed toward center $CP_1$ and $CP_2$, respectively. The components $F_{1x}$ and $F_{3x}$, which are parallel to axis O-x, are oppositely directed and have no effect on the movement of the armature, but the components $F_{1y}$ and $F_{3y}$, which are perpendicular to axis O-x, are both in the same direction and so add together, tending to return the armature towards its position of equilibrium. Forces $F_1$ and $F_3$ and their components $F_{1x}$, $F_{3x}$, $F_{1y}$ and $F_{3y}$ are shown by dashed lines in FIG. 4.

Figure 3:
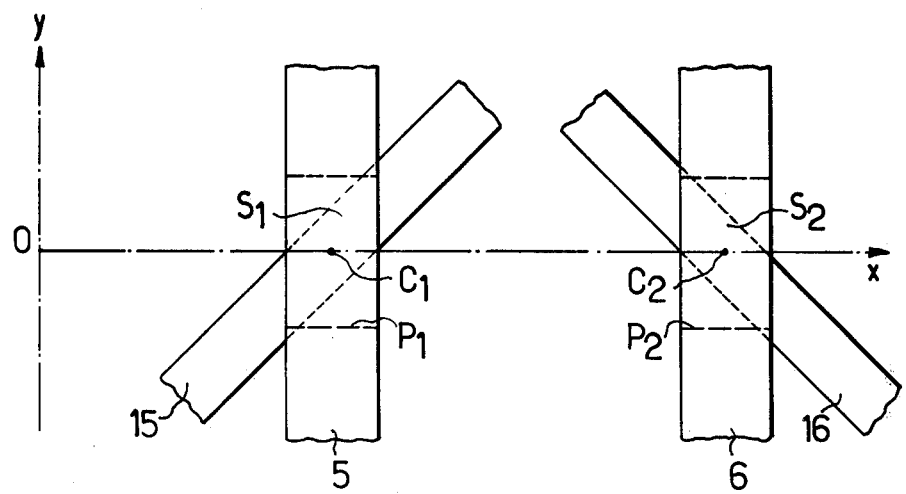
FIGS. 3 and 4 are diagrams useful in explaining the operation of the motor of FIG. 1.

Similarly, if armature 10 is displaced slightly towards the left from its equilibrium position in FIG. 3, it is urged back towards the equilibrium position by force components $F_{2x}$ and $F_{3x}$ of forces $F_2$ and $F_3$, the force components parallel to axis O-x. Conversely, if armature 10 is displaced to the right from the equilibrium position of FIG. 3, force components $F_{1x}$ and $F_{4x}$ tend to bring it back towards the equilibrium position, these components $F_{1x}$ and $F_{4x}$ being directed towards the left in FIG. 4.

Let us now suppose that the windings B, B' of coil body members 3 and 4 are energized so as to produce poles which are movable peripherally in space, following the direction of the teeth 5 and 6. By an analysis analogous to the preceding one, it can be determined that armature 10 is driven in rotation in the direction corresponding to the direction of displacement of the poles of half-coil body members 3 and 4, by force components $F_{2y}$ and $F_{4y}$ or $F_{1y}$ and $F_{3y}$ in the direction of displacement of the poles. In the same way, if windings B, B' of half-coil body members 3 and 4 are energized to produce poles which move along the axis O-x of the motor, armature 10 is displaced in translation because of the action of the components $F_{2x}$ and $F_{3x}$ or $F_{1x}$ and $F_{4x}$ in the direction of axial displacement of the poles. It is of course understood that if a sequence is produced which causes both rotation and translation of the poles, a displacement is obtained which is a corresponding sequence of movements of rotation and translation.

Figure 2:
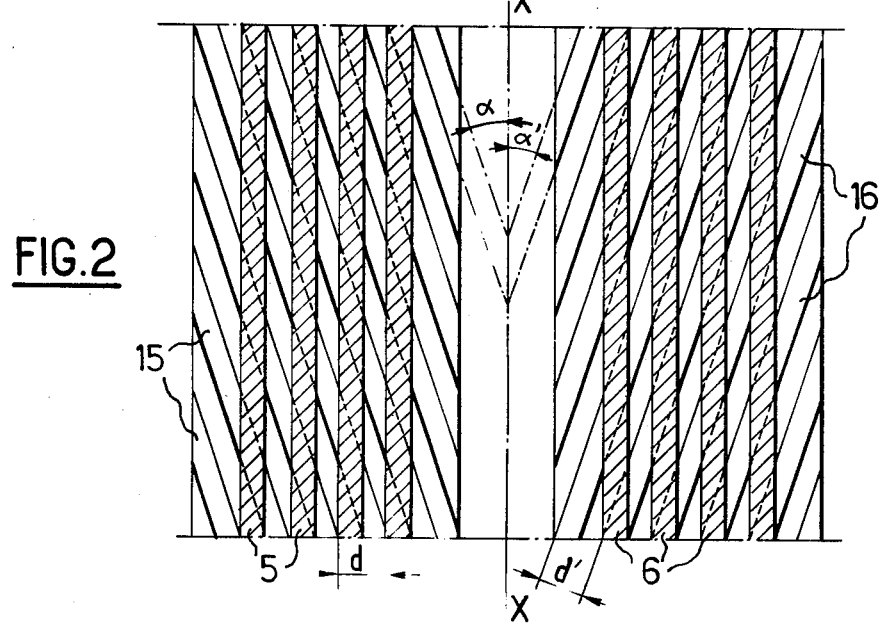
FIG. 2 is a partial developed and sectional view of the pole surfaces of the motor of FIG. 1, taken along line II—II of FIG. 1.

According to a modified embodiment of the motor of the present invention, which in partial section is identical to FIG. 2, the two windings have a generally planar form and are mutually parallel. The movable armature, which is preferably the driven one, is displaced parallel to the fixed coil, following orthogonal movements. This planar motor possesses, in comparison to the motor of the above-mentioned U.S. patents, the advantage of only requiring, for a stepping drive, a single controlling device, which is connected simultaneously to two half-windings and can likewise be driven with alternating current, as discussed below.

There is shown in FIG. 5 another embodiment of a motor in accordance with the present invention, in which the coil encircles the driven armature, the latter being movable in translation and in rotation and transmitting its movements via a shaft on which it is mounted.

The motor shown in FIG. 5 includes a cylindrical body 17, within which are positioned two half-coil body members 18 and 19 whose interior surfaces have pole teeth 20 and 21, respectively, having a structure similar to that of the teeth 5, 6 of the motor of FIG. 1. Teeth 20, 21 can, for example, be straight teeth, that is, of generally annular form and all mutually parallel. Body 17 is closed at its ends by two supports 22 and 23 which support, by means of bearings (not shown), a shaft 24 which can be movable in translation and in rotation. On shaft 24 are fixed two half-armatures 25 and 26, of generally cylindrical form, which can pass within the two half-coil body members 18 and 19 and which have on their outer faces helical teeth, 27 and 28, respectively, the structure of which is similar to that of teeth 15, 16 of the motor of FIG. 1.

The operation of the motor shown in FIG. 5 is similar to that of the motor of FIG. 1, the only difference being that the armature is mounted concentrically within the coil and that it drives shaft 24 when displaced. In certain applications this can be of more interest than the utilization of the arm 11 of the motor of FIG. 1.

In a practical embodiment of the motor of FIG. 1, intended to drive the gearbox of an automobile, a rotational force of 5 Newton-meters and a translational force of 400 Newtons have been obtained. This is only one embodiment out of a greater number of possible practical embodiments. One of the advantages of the motor of the present invention resides in the free choice of the ratio of rotational force to translational force, since rotation and translation are obtained by driving the various windings in different ways, as explained below, and that different arrangements of these windings can thus be provided for the same electrical driving power.

The efficiency of the machine of the present invention is comparable to that of the conventional electric machines and is around 90%. None of the specific parameters of the machine exert any appreciable effect on its efficiency. On the other hand, the specific power of the machine varies strongly as a function of the ratio of the tooth width to the pole pitch. It has been found that in the case of the practical embodiment cited, the optimal value of this ratio, tooth width/pole pitch, is in the order of $\frac{1}{2}$.

FIGS. 6 and 7 depict variations of the motors shown in FIGS. 1 and 5, respectively, with conductors disposed between the teeth of each of the two half-armatures. FIG. 8 is an enlarged fragmentary view depicting portion A—A of each of FIG. 6 and FIG. 7 and showing a typical conductor in the form of a metallic wire conductor 101 with an insulating covering 102. The electrical conductors form a "squirrel-cage" to ensure operation by induction.

In FIG. 9 there is shown, very diagrammatically, another embodiment of a motor in accordance with the present invention, having the two half-coils and the two half-armatures overlapping.

The coil 29 of the motor shown in FIG. 9 includes a winding 31 which has not been shown in detail and which comprises two overlapping but electrically independent half-windings which can be wound simultaneously on the same ferromagnetic body 32. On its internal surface, coil 29 has pole teeth 33 of generally annular form, the annuli thus formed being mutually parallel.

Armature 34 is mounted within coil 29 by means of bearings (not shown) that permit both translational movement and rotational movement. Armature 34 is in the form of a solid shaft 35 having, on its peripheral surface, pole teeth 36 and 37, each in the form of a helix and being, preferably, mutually symmetrical. The two half-coils and half-armatures have thus been "gathered together" into a single coil and a single armature, thus reducing the bulk of the motor.

It can easily be understood that, in the same way as for the embodiments described above, the pole teeth of the coil can have a helical structure and the teeth of the armature can have an annular structure, and that either the coil or the armature can be fixed.

The overlapping of the coil windings can give rise to phenomena of mutual reaction, but the principle of operation of the motor of FIG. 9 is the same as that of the embodiments described above.

The driven armature of the motor of FIG. 9 can likewise be embodied as depicted in FIG. 10 in the form of a solid ferromagnetic shaft 134 with a smooth external surface, to obtain operation by induction.

For all the motors described above, the air gap can be filled with an insulating ferro-fluid. This ferro-fluid is a superparamagnetic medium having a relative permeability of about 2, enabling the magnetomotive force of the machine in which it is utilized to be diminished and the bulk of the machine thus to be reduced. Moreover, this ferro-fluid can facilitate removal of the heat produced in the machine, and can consequently permit the ratio of the machine power to the machine mass to be raised. It is evident that the use of the ferro-fluid makes necessary appropriate means of sealing, particularly in the region of the rotor bearings, and possibly means of circulation of this fluid, as in the case of conventional motors utilized with ferro-fluid.

There is shown in FIG. 11 an example of a control circuit for a motor in accordance with the present invention. In FIG. 11, a three-phase electrical supply is shown, the windings of the two half-coils being energized by such a three-phase current. However, it is equally possible to supply the motor with single-phase current or with current of any given number of phases.

In FIG. 11, the windings of the two half-coils of a motor in accordance with the present invention are labeled 38 and 39. These two windings 38 and 39 are fed from a three-phase mains supply via a three-phase inverter 41 and 42, respectively. Each inverter 41 and 42 is controlled by a control device 43 and 44, respectively, and includes an open-circuit position.

The control devices 43 and 44 can be simple control handles in the case where there is no need for the motor to have a very high precision of positioning or a very small displacement. In the contrary case, the control devices 43 and 44 can be electromechanical or electronic, such as end-of-run contactors, position pickups, etc., cooperating with the movable armature of the motor and controlling the switching of the inverters 41 and 42.

According to the different relative positions of the inverters 41 and 42, there is obtained rotation in either direction or translation in either direction, or even a helical movement. These different possibilities of movement as a function of the different positions of the inverters 41 and 42 can be readily determined, particularly with reference to FIGS. 3 and 4.

It is thus seen that a machine in accordance with the present invention offers the advantage of carrying out displacement equally well in rotation or in translation, that is to say that it permits any given solid angle to be described, by means of the very simple control device, as described above, and that moreover, in the case of a motor, the values of the rotational force and of the translational force obtained can be chosen independently of each other, while still obtaining an efficiency comparable to that of conventional motors.

It is to be understood that the cylindrical embodiment of the machine can comprise, both for the movable winding and for the fixed winding, pole teeth all having a generally annular form or even a helical form, so long as for each assembly the teeth of each half-assembly are symmetrical, with respect to the median plane of the machine, to the teeth of the corresponding half-assembly, and this including different angles for each of the two overlapping half-assemblies.

As set out above, the end effects, which are particularly noticeable for motors of high power, can be compensated by variations of the spacing of adjacent teeth. Nevertheless, other well known solutions can be utilized, for example the inclusion of compensating windings. Although the present invention has been described with reference to preferred embodiments, modifications and rearrangements could be made, and still the result would be within the scope of the invention.

What is claimed is:

1. An alternating current electrical machine having a movable armature capable of executing movements of rotation and of translation, comprising: a first body member; two electrically separated coil windings positioned on said first body member; two groups of teeth disposed on the said first body member; a driven armature body member; two groups of teeth disposed on said driven armature body member; and means for providing alternating electrical current to said coil windings; each of said groups of teeth of said first body member being substantially symmetrical with respect to the median plane of the machine, each of said groups of teeth of said driven armature member being substantially symmetrical with respect to said median plane of said machine and corresponding with one of said groups of teeth on said first body member, the teeth of each of said two groups of teeth of said first body member being positioned at a first angle with respect to said median plane, and the teeth of each of said two groups of teeth of said driven armature body member being positioned at a second angle, different from said first angle, with respect to said median plane.

2. A machine as claimed in claim 1 in which each of said first angle and said second angle is an angle of between about 0° and about 85° and in which said first angle differs from said second angle by an amount of between about 5° and about 40°.

3. A machine as claimed in claim 2 in which each of said first angle and said second angle is an angle of between about 0° and about 45°.

4. A machine as claimed in claim 1 in which the two coil windings overlap on the first body member.

5. A machine as claimed in claim 1 in which the driven armature body member encircles the first body member.

6. A machine as claimed in claim 1 in which the first body member encircles the driven armature body member.

7. A machine as claimed in claim 1, in which the teeth of said first body member have a uniform tooth pitch and a uniform cross-section.

8. An alternating current electrical machine having a movable armature capable of executing movements of rotation and of translation, comprising: a first body member; two electrically separated coil windings positioned on said first body member; two groups of teeth disposed on the said first body member; a driven armature body member; two groups of teeth disposed on said driven armature body member; and means for providing alternating electrical current to said coil windings; each group of teeth on said driven armature body member corresponding with one of said groups of teeth on said first body member; the number of teeth of each of said two groups of teeth of said driven armature body member being equal to the number of poles of the corresponding coil winding.

9. An alternating current electrical machine having a movable armature capable of executing movements of rotation and of translation, comprising: a first body member; two electrically separated coil windings positioned on said first body member; two groups of teeth disposed on the said first body member; a driven armature body member; two groups of teeth disposed on said driven armature body member; and means for providing alternating electrical current to said coil windings; each group of teeth on said driven armature body member corresponding with one of said groups of teeth on said first body member; the teeth of said first body member having a uniform tooth pitch and a uniform cross-section, and the teeth of the driven armature body member having a uniform tooth pitch and a uniform cross-section.

10. A machine as claimed in claim 9 in which the teeth of said first body member and the teeth of said driven armature body member have the same tooth pitch and the same cross-section.

11. An alternating current electrical machine having a movable armature capable of executing movements of rotation and of translation comprising: a movable armature divided into two half-armatures; a fixed coil assembly divided into two half-coil assemblies; two groups of teeth on said movable armature, one group of teeth associated with each half-armature; two groups of teeth on said fixed coil assembly, one group of teeth associated with half-coil assembly; two independent electrical windings on said coil assembly, one winding associated with each half-coil assembly; and means for energizing said two electrical windings with alternating current; said groups of teeth of said half-coil assemblies being substantially symmetrical with respect to the medium plane of the machine, said groups of teeth of said half-armature being substantially symmetrical with respect to said medium plane of said machine, the teeth of each of said two groups of teeth of said half-coil assemblies being positioned at a first angle with respect to said medium plane, and the teeth of each of said two groups of teeth of said half-armatures being positioned at a second angle, different from said first angle, with respect to said median plane.

12. A machine as claimed in claim 11, in which each of said first angle and said second angle is an angle of between about 0° and about 85°, and in which said first angle differs from said second angle by an amount of between about 5° and about 40°.

13. A machine as claimed in claim 12 in which each of said first angle and said second angle is an angle of between about 0° and about 45°.

14. An electrical machine as claimed in claim 11, further comprising conductors disposed between the teeth of each of the two half-armatures.

15. A machine as claimed in claim 14, in which each of said first angle and said second angle is an angle of between about 0° and about 85°, and in which said first angle differs from said second angle by an amount of between about 5° and about 40°.

16. A machine as claimed in claim 15, in which each of said first angle and said second angle is an angle of between about 0° and about 45°.

17. A machine as claimed in claim 14, in which the number of teeth of each of said two groups of teeth of said armature is equal to the number of poles of the corresponding half-coil assembly.

18. A machine according to claim 14, in which the teeth of said half-coil assemblies have a uniform tooth pitch and a uniform cross-section, and in which the teeth of the movable armature have a uniform tooth pitch and a uniform cross-section.

19. A machine as claimed in claim 18 in which the teeth of said half-coil assemblies and the teeth of said half-armatures have the same tooth pitch and the same cross-section.

20. An electrical machine as claimed in claim 14 in which each half-armature is positioned as an extension of the other half-armature and mechanically connected thereto and in which each half-coil assembly is positioned as an extension of the other half-coil assembly and mechanically connected thereto.

21. A machine as claimed in claim 14 in which the two coil windings overlap on the fixed coil assembly.

22. A machine as claimed in claim 14 in which the movable armature encircles the fixed coil assembly.

23. A machine as claimed in claim 14 in which the fixed coil assembly encircles the movable armature.

24. An electrical machine as claimed in claim 11 in which said movable armature is of a generally planar form, each half-armature being positioned as an extension of the other half-armature and mechanically connected thereto; and in which said fixed coil assembly is of generally planar form, each half-coil assembly being positioned as an extension of the other half-coil assembly and mechanically connected thereto.

25. A machine as claimed in claim 24, in which each of said first angle and said second angle is an angle of between about 0° and about 85°, and in which said first angle differs from said second angle by an amount of between about 5° and about 40°.

26. A machine as claimed in claim 25 in which each of said first angle and said second angle is an angle of between about 0° and about 45°.

27. A machine as claimed in claim 24, in which the number of teeth of each of said two groups of teeth of said armature is equal to the number of poles of the corresponding half-coil assembly.

28. A machine according to claim 24, in which the teeth of said half-coil assemblies have a uniform tooth pitch and a uniform cross-section, and in which the teeth of the movable armature have a uniform tooth pitch and a uniform cross-section.

29. A machine as claimed in claim 28, in which the teeth of said half-coil assemblies and the teeth of said half-armatures have the same tooth pitch and the same cross-section.

30. An electrical machine as claimed in claim 11 in which each half-armature is positioned as an extension of the other half-armature and mechanically connected thereto and in which each half-coil assembly is positioned as an extension of the other half-coil assembly and mechanically connected thereto.

31. A machine as claimed in claim 11 in which the two coil windings overlap on the fixed coil assembly.

32. A machine as claimed in claim 11 in which the movable armature encircles the fixed coil assembly.

33. A machine as claimed in claim 11 in which the fixed coil assembly encircles the movable armature.

34. An alternating current electrical machine having a movable armature capable of executing movements of rotation and of translation comprising: a movable armature divided into two half-armatures; a fixed coil assembly divided into two half-coil assemblies; two groups of teeth on said movable armature, one group of teeth associated with each half-armature; two groups of teeth on said fixed coil assembly, one group of teeth associated with each half-coil assembly; two independent electrical windings on said coil assembly, one winding associated with each half-coil assembly; and means for energizing said two electrical windings with alternating current; the number of teeth of each of said two groups of teeth of said armature being equal to the number of poles of the corresponding half-coil assembly.

35. An alternating current electrical machine having a movable armature capable of executing movements of rotation and of translation comprising: a movable armature divided into two half-armatures; a fixed coil assembly divided into two half-coil assemblies; two groups of teeth on said movable armature, one group of teeth associated with each half-armature; two groups of teeth on said fixed coil assembly, one group of teeth associated with each half-coil assembly; two independent electrical windings on said coil assembly, one winding associated with each half-coil assembly; and means for energizing said two electrical windings with alternating current; the teeth of said half-coil assemblies having a uniform tooth pitch and a uniform cross-section, and the teeth of said movable armature having a uniform tooth pitch and a uniform cross-section.

36. A machine as claimed in claim 35 in which the teeth of said half-coil assemblies and the teeth of said half-armatures have the same tooth pitch and the same cross-section.

37. An alternating current electrical machine having a movable armature capable of executing movements of rotation and of translation, comprising: a first body member; two electrically separated coil windings positioned on said first body member; two groups of teeth disposed on the said first body member; a driven armature body member; two groups of teeth disposed on said driven armature body member; and means for providing alternating electrical current to said coil windings; each group of teeth on said driven armature body member corresponding with one of said groups of teeth on said first body member, the two coil windings being positioned on said first body member in axially aligned, end-to-end relationship, the two groups of teeth on said first body member being in axially aligned, end-to-end relationship, and the two groups of teeth on said driven armature body member being in axially aligned, end-to-end relationship.

* * * * *